April 27, 1937. G. S. SCHABERLE Re. 20,345
THERMIONIC RELAY TUBE SYSTEM
Original Filed April 12, 1932
Fig. 1.
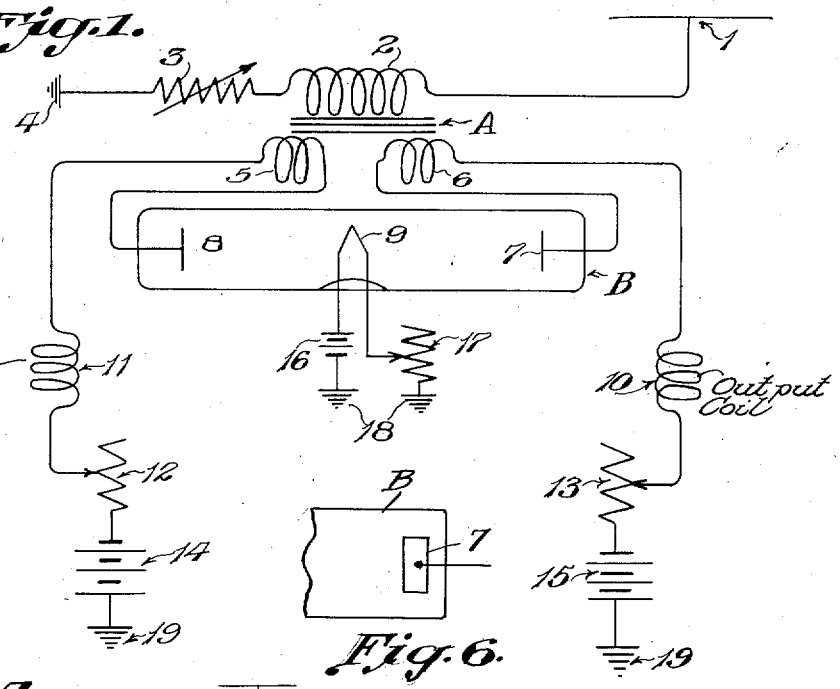
Fig. 5.
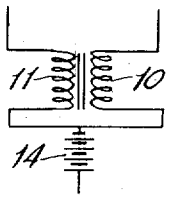
Fig. 6.
Fig. 4.
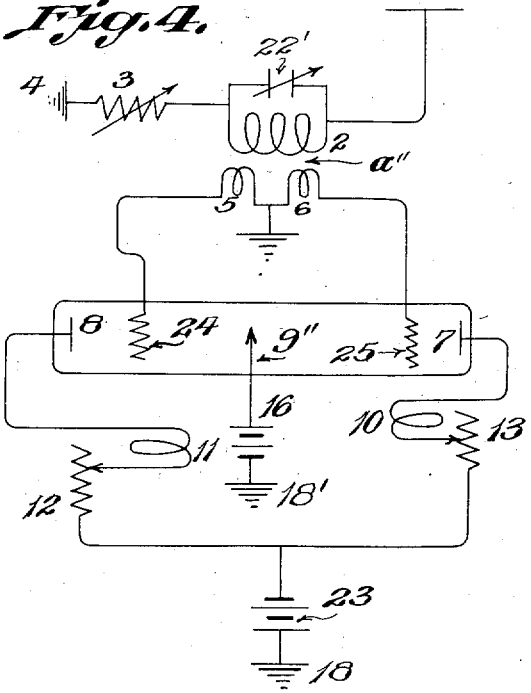
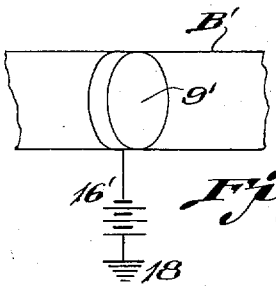
Fig. 2.
Fig. 3.
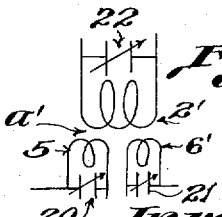
Inventor
George S. Schaberle Reissued Apr. 27, 1937

Re. 20,345

UNITED STATES PATENT OFFICE 20,345

THERMIONIC RELAY TUBE SYSTEM

George S. Schaberle, Hempstead, N. Y.

Original No. 1,960,349, dated May 29, 1934, Serial No. 604,748, April 12, 1932. Application for reissue May 28, 1936, Serial No. 82,380

18 Claims. (Cl. 250—27)

My invention relates to vacuum tube relays and auxiliary control circuits, and more particularly to the well known apparatus in which current is carried across a gas filled space between electrodes, said gas having been carefully selected for its ionization and current conductivity characteristics.

The purpose of this invention is to eliminate mechanically moving metal parts such as armatures, contacts, retractile springs, and vibrating elements, in electro-magnetic circuits such as signalling, Morse telegraph, telephone ringing and switchboards and fire alarm systems, and wherever such devices are employed in connection with pulsating direct current or alternating current circuits, where the purpose or function of such a device is to create mechanical reciprocal motion.

Figure 1 diagrammatically illustrates a system including one form of tube which may be employed in accordance with the invention;

Figure 2 illustrates an alternative form of cathode structure;

Figure 3 is a circuit detail illustrating a modified form of the system shown in Figure 1;

Figure 4 illustrates a modified form of the tube shown in Figure 1;

Figure 5 illustrates a common core structure for the opposing translating device coil windings; and Figure 6 illustrates a plane surfaced anode structure.

In the present systems the mechanical relays, although still superior to many forms of tube relays yet developed, have many disadvantages, chiefly due to the mechanically moving metal parts which require a great deal of service maintenance. Most of this centers around the metal armatures which move between contacts, involving expensive maintenance and replacements. Still another advantage the vacuum tube has over the mechanical relay is gained by the elimination of time lag, due to inertia of the moving metal parts. This automatically removes the speed limits with which signals may be transmitted or received in communication systems.

The principal object of this invention is to do away with all moving metal parts in the relays, by substituting therefore a radiant energy tube. Still another object is to provide a relay tube that has a long life, requires no supervision during its life, and one that repeats the incoming signal without distortion or varying its quality and signal characteristics.

A specific object is to provide an elongated vessel or glass envelope, previously exhausted of air and moisture, into which have been sealed a multiple of anodes, a cathode common to several anodes and situated equi-spaced between multiples of such anodes, said anodes having their plane surfaces parallel with the plane surfaces of said cathode, and the plane surfaces of the anodes and the cathode being perpendicular to the long axis of the elongated envelope, and the space between said anodes and the cathode filled with a carefully predetermined volume of inert gas or metallic vapour.

In a tube of this kind, certain sliding scale constants present themselves, such as length and internal diameter of the vessel, anode and cathode surface areas, spacing of these elements, whether the elements are coated with an active metallic element or uncoated, the type of cathode used, and whether said cathode is of the hot filament type or the cold metal disc, the kind and pressure of gas, whether such gas is of a pure kind or a mixture of two or more gases, such as neon and krypton or neon and xenon.

The cathode may be of the common flat ribbon type, or the cold cathode or element such as a disc of nickel or molybdenum. The type of cathode selected depends upon the use of the tube and also upon the kind and pressure of gas to be used in the tube.

For a better understanding of my invention refer now to Figure 1 of the accompanying drawing which shows a tube B of pyrex glass, the model of which is eight inches in length, having an anode sealed in each end with a spacing between the anodes of 6 inches; a cathode located substantially near the halfway point between the two ends of the tube and 72 m. m. distant from each of the oppositely situated anodes; inside diameter of the tube 28 m. m.; diameter of the plane surface of each disc anode 22.5 m. m.; pressure of neon 4 m. m., mixed with .04 per cent of krypton; a constant positive 135 volts potential on each anode; supplied by batteries, with the negative poles grounded to a common ground; cathode heater voltage 6 volts negative grounded.

This arrangement requires a breakdown voltage of 185 volts minimum in order to start ionization of the gas between the common cathode and one anode, and establishes a minimum operating voltage of 60 volts between the operated anode and the cathode.

Theory: When a cathode and an anode are sufficiently distantly spaced in a tube of low pressure gas, considerably more voltage is required to start ionization in order to permit a current to flow between the elements than is necessary to keep the current flowing after ionization has once begun. This increased voltage is only necessary for a moment, and will hereinafter be called the breakdown voltage. This breakdown voltage as required in this invention, is always a critical point. Likewise there is also a critical minimum operating point, above which the ionization will sustain, and below such a point the ionization will cease. This critical minimum operating point varies somewhat with temperature, especially in the case where mercury vapour is used for the conducting medium. Normally the operating potential should be equal or nearly equal the potential of the line signal from the sending station.

For a signaling system using series of reversals such as pulsating direct current negative and positive alternations, which are intended to operate a mechanical device with reciprocal motion, a control circuit such as shown in Figure 1 is employed. In this figure, the transformer A consists of a primary winding 2, two secondary windings 5 and 6 and a core of saturated laminations for controlling the wave front of the incoming signal in the secondary windings. The incoming signal approaches the primary winding 2 over line 1, is controlled by the variable impedance 3, going to ground 4. In Figures 1 and 4 it should be understood that all grounds shown are common grounds.

Referring again to Figure 1, batteries 14 and 15 supply the positive potential for the anodes 7 and 8, having their negative poles grounded.

Battery 16 supplies potential of negative polarity to the filament 9, through controlling rheostat 17 to ground. The positive pole of battery 16 also goes to ground 18, which is a common ground. The inductive resistances 10 and 11 in series with the anode circuits form the load in the circuit, and may consist of windings, both on the same core but acting oppositely or may be separately wound as magnet coils, or for any purpose whatsoever. The voltage drop across these coils should be predetermined and calculated to be consistent with the voltage characteristics of the device as a whole in order that the anode potential is not drawn below the minimum operating critical point, during the reception of a signal.

The non-inductive rheostats in the anode circuits, points 12 and 13 are intended to control the magnitude of the current in these circuits and should be so designed that the drop across each unit of the variable impedance will increase in like ratio as the current may increase due to the rise in temperature of the gas within the tube, due to increased ionization because of molecular excitation.

With the potentials now standing on anodes 7 and 8 of like positive polarity, a positive impulse coming over line 1 through the primary winding 2 of transformer A and being of the same or nearly equal potential as already stands on either anode, the induced potential in winding 5 will drop substantially to zero, while the potential induced in winding 6 will raise the potential on anode 7 substantially above the breakdown point of the gas-filled space between anode 7 and cathode 9, and a current will continue to flow by virtue of battery 15, through the controlling impedance 13 and coil 10, winding 6, anode 7, through the ionized gas to cathode 9 and to grounds 18 and 19 which are common. The current will now continue to flow in this circuit until a negative impulse is received over line 1, when a current flow is started in the circuit of anode 8, causing coil 11 to operate in the opposite direction to that of coil 10, made possible by the current in anode 7 circuit being decreased substantially to zero by the direction and magnitude of the induced current in secondary winding 6 of transformer A. The current in the circuit of anode 8, until the polarity of the line potential is again made positive, will continue to flow by virtue of battery 14, through the controlling impedance 12, coil 11, secondary winding 5 of transformer A, to anode 8 and through the gas filled space to the common cathode 9, thence to the common grounds 18 and 19, to complete the circuit.

So far in this disclosure, reference has been confined to the hot cathode or electron emitting filament shown in Figure 1 of the accompanying drawing. This type of tube may be modified by employing a cold metal disc having two plane surfaces, or two such discs, either fastened together or separated by a glass divider or such type of insulating material as porcelain or pyrex. Figure 2 shows a single disc type of element which may be inserted in Figure 1 to replace cathode 9. With this arrangement, battery 16 may be left connected to the cold disc for biasing purposes, with the controlling rheostat 17 removed. The polarity of battery 16 may be reversed as conditions require.

The glass divider mentioned in connection with the use of two cold metal discs as cathode elements may be sealed to the inside perimeter of the tube, dividing the tube into two separate sections and effectively preventing back-glow from one operated side to the unoperated side. In this arrangement a higher pressure of gas is required, but the result is a much sharper defined signal in coils 10 and 11, and also allows for a smaller tube to be used.

Figure 4 shows still a third modification in the use of control grids 24 and 25. This was the arrangement used in the first models several years ago. Although the arrangement makes for an operative device, it has a slight disadvantage over the direct anode controlled models in the fact that ionization of the gas contained in the tube is a function of temperature. Since all gases tend to increase in temperature after ionization has started, the grids lose control of the ionization if the temperature is allowed to rise above a critical point.

The advantage the grid control system has over the direct anode controlled tube lies in the fact that when coupled with the cold disc cathode and a proper cooling system for the tube, greater current amplification may be attained. The only exception to this is when mercury vapour is used. In this case outside means of cooling and very large grid biasing potentials are usually introduced.

In the foregoing description of my invention, mention has only been made of an elongated vessel or tube. The brevity of this description is in no way or manner intended to limit the tube to a straight elongated tube, since the results are the same for a tube of specific dimensions, with metallic elements of specific surface areas, coupled with specific volume, pressure and kind of gas to be used, and this allows the tube to be bent into any shape whatsoever.

In connection with Figure 1 of the accompanying drawing, the secondary windings 5 and 6 of transformer A may be used with a saturated core, or tuned with variable capacitances as shown in Figures 3 and 4, in which case the primary winding may also be tuned by means of a condenser 22. The main object is to induce a potential in the secondary windings with an abrupt wave front and sufficiently flat top to insure the tube striking without loss of characteristic to the signals in the output coils 10 and 11 of Figure 1. This is best accomplished by the correct saturation of the core of transformer A of Figure 1, or by a combination of transformer A of Figure 1 and Figure 3 which would considerably improve the wave front of signals coming over a long line of high electrical capacity, care being taken that condensers 20 and 21 are of sufficiently low capacity to avoid setting up oscillations in the tube. This may be further modified by using the system shown in Figure 4.

What I claim as new and desire to secure by Letters Patent is:

1. A system for translating electrical pulsations, including a discharge device containing an ionizable medium, a plurality of paired oppositely acting anodes disposed therein about a common cathode, the geometry of the containing vessel, the electrodes and the kind and pressure of the said ionizable medium combining to create critical potential ionization and deionization points between the common cathode and either anode, said critical points corresponding to potential drops respectively between the said electrodes, means for applying constant potentials to the anodes in series with regulating devices for controlling the current flow and translating devices, means for alternately and oppositely raising and lowering the potential drop between the said common cathode and the respective anodes, said last means comprising a transformer having its primary winding connected to the signal source, and a plurality of paired secondary windings, means for applying the potentials from opposing ends of the said paired secondary windings to the ionizable medium on opposite sides of the common cathode, so that the voltage drop from the respective anodes to the common cathode will be alternately and oppositely raised and lowered simultaneously for every reversal of electrical polarity in the said primary winding.

2. A system for relaying electrical pulsating signals, including a discharge device containing an ionizable gas and a plurality of anodes disposed about and equi-spaced from a common cathode, means for applying positive biasing potentials to the respective anodes of a magnitude insufficient to establish ionization within the device, and means for applying potentials corresponding to signal impulses to said anodes of such magnitude as to alternately raise and lower the potentials of the respective anodes beyond the critical ionization and de-ionization voltage points, said last means comprising a transformer having a primary winding connected to the signal source, and a plurality of secondary windings, one of which last-mentioned windings is included in each of the anode circuits, and signal translating means in the anode circuits responsive to current flow established by initiation of a discharge in the respective anode circuits, and means for supplying potentials to the cathode.

3. The combination of claim 2 wherein the second means consists of a tuned primary winding and two tuned secondary windings, the tuning so arranged that the induced signal in the secondary windings have a wave form consisting of an abrupt, substantially perpendicular front, and is flat topped so as to lengthen the time period, said windings being so arranged that a signal of one polarity when received in the primary winding will affect the two oppositely situated anodes electrostatically oppositely and without setting up oscillations.

4. The combination set forth in claim 2 wherein the means for applying biasing potentials to the anodes comprises a common battery in series with the signal translating device, and current regulating impedances individual to the respective anode circuits.

5. The combination set forth in claim 2, including means for causing the pulsating signals to assume an abrupt wave front, said means comprising a saturated core structure for said transformer.

6. The combination set forth in claim 2 in which the ionizable medium is a gas mixture comprising neon at a predetermined pressure determined by the geometry of the tube and its anode biasing potentials, said pressure then being increased to .04 per cent by adding krypton.

7. The apparatus for relaying direct current pulsating signals in communicating circuits, consisting of a vessel previously exhausted of air and moisture, and containing an ionizable medium of predetermined pressure, volume, and mixture, consistent with the dimensions of the tube and its functions, a plurality of anodes disposed about and equi-spaced from a common cathode, leads from said cathode to a source of grounded potential and a controlling impedance the opposite side of which is also grounded, leads from each anode to one end of a secondary winding of a saturated core transformer, leads from the opposite ends of said secondary windings to the opposed translating device windings, leads from said magnet coils to the current control non-inductive impedances, leads from said impedances to a constant source of potential, said source of potential to be common to the various anode circuits, said source of potential to have a pole of positive polarity towards the anode and its negative pole connected by a lead or leads to a common ground, said source of potential to keep a constant operating potential towards the anodes, said constant potential to be substantially raised or lowered by induced potentials into the secondary windings of the saturated core transformer which are connected into the anode circuits in series, one winding to each anode, said induced potentials to present a wave form which has an abrupt front and substantially flat topped, said induced potentials to be so formed by means of saturation of the transformer core, said potentials to be derived from a line signal passing through the primary winding of said saturated core transformer, said primary winding to be connected in series with the incoming line, and outside means for creating such signals in the line.

8. A system for translating pulsating electrical signals including a gas-filled vessel, a pair of opposed anodes therein equi-spaced and disposed about a common cathode, means for applying constant electrical potentials to said anodes with respect to a common circuit connection to said cathode, a pair of opposed control elements disposed about the cathode, means for alternately raising and lowering the voltage drop between the cathode and each anode by reversing the electrical polarities of the control elements, said last means comprising a transformer having a primary winding connected to the signal source, and a plurality of secondary windings, one of each last-mentioned windings being individual to each respective control element, means for connecting electrically opposite ends of said secondary windings to said opposing control elements, and means for connecting the other ends of the said secondary windings to the common return circuit, so that when a signal of one electrical polarity is received the paired control elements will be electrically oppositely charged.

9. The combination set forth in claim 8 wherein the anodes have plane surfaces parallel to each other, said plane surfaces being at right angles to the long axis of the containing vessel.

10. The combination set forth in claim 8 wherein the said primary winding of the said transformer is capacity tuned.

11. The combination set forth in claim 8 wherein the secondary windings of the line transformer are tuned by bridging condensers across the said windings.

12. In combination, a signaling circuit, two translating circuits each including in serial circuit relation a signal translating device, a space discharge path comprising two spaced electrodes mounted in an ionizable atmosphere, and a source of current having a voltage lower than the ionization potential and above the discharge sustaining potential of said discharge path, and means for coupling said translating circuits to said signalling circuit and being responsive to the receipt of signal impulses from said signaling circuit for increasing the potential across the electrodes of one discharge path to a value above the ionization potential and decreasing the potential across the electrodes of the other path to a value below the discharge sustaining potential.

13. In combination, a signaling circuit, a signal translating device having two operating windings, a pair of translating circuits each including in serial circuit relation one of said operating windings, a space discharge path comprising two spaced electrodes mounted in an ionizable atmosphere, and a source of current having a voltage lower than the ionization potential and above the discharge sustaining potential of said path, and means for coupling said translating circuits to said signalling circuit and being responsive to the receipt of signal impulses from said signaling circuit for increasing the potential across the electrodes of one discharge path to a value above the ionization potential and decreasing the potential across the electrodes of the other discharge path to a value below the discharge sustaining potential.

14. In combination, a signaling circuit over which signal impulses of opposite polarity are transmitted, two translating circuits each including in serial circuit relation a signal translating element, a space discharge path comprising two spaced electrodes mounted in an ionizable atmosphere, and a source of current having a voltage lower than the ionization potential and above the discharge sustaining potential of said discharge path, and means for coupling said translating circuits to said signalling circuit and being responsive to the receipt of signal impulses of one polarity for increasing the potential across the electrodes of one discharge path to a value above the ionization potential to energize the first translating circuit and for decreasing the potential across the electrodes of the other path to a value below the discharge sustaining potential to de-energize the second translating circuit, said means being responsive to receipt of signal impulses of the opposite polarity for energizing the second translating circuit and de-energizing the first translating circuit.

15. A system for relaying signal impulses including means comprising two electrodes providing a plurality of space current paths through a medium containing ionizable gas, means for applying across the electrodes of each of said paths, a biasing voltage of a magnitude insufficient to establish conduction by ionization across said path, a source of incoming signal energy supplying signal impulses of opposite polarity, means for deriving from each of said signal impulses a plurality of substantially equal voltage impulses and means for superposing said equal voltage impulses across the cathode and anode electrodes of said space current paths simultaneously but in opposite directions with respect to said biasing voltage, the magnitude of the biasing and signal voltages being such that on receipt of a signal impulse the total applied voltage across one of said space current paths exceeds the critical ionization potential and the total applied voltage across said other space current path falls below the de-ionization potential of said gas, and a signal translating device having two operating windings energized respectively by currents flowing through said space current paths.

16. In combination, a signaling circuit, a signal translating device having two operating windings, a transformer having a primary winding connected to said signaling circuit, a secondary winding on said transformer connected in serial circuit relation with one operating winding of said translating device, a second secondary winding on said transformer connected in serial circuit relation with the second operating winding of said translating device, an ionizable discharge path included in serial circuit relation with each operating winding, each of the circuits of said operating windings also including a source of biasing potential having a voltage lower than the ionizable potential and above the discharge sustaining potential of the discharge path, said secondary windings being arranged to simultaneously apply voltages to the circuits of said operating windings of such polarity that the resultant voltage across one discharge path is increased above the ionization potential and the resultant voltage across the other discharge path is decreased below the discharge sustaining potential.

17. In combination, a signaling circuit over which signal impulses of opposite polarity are transmitted, two space discharge devices each comprising an anode and a cathode element mounted in an envelope containing ionizable atmosphere, two translating circuits each including one of said discharge devices and a source of direct current having a voltage lower than the ionization potential and above the discharge sustaining potential of the discharge device, a signal translating element having an operating winding connected in each of said translating circuits in opposing relation, and means responsive to the receipt of signal impulses of one polarity for increasing the potential across the electrodes of one discharge device to a value above the ionization potential to energize the first translating circuit for decreasing the potential across the electrodes of the other discharge device to a value below the discharge sustaining potential to de-energize the second translating circuit, said means being responsive to receipt of signal impulses of the opposite polarity for energizing the second translating circuit and de-energizing the first translating circuit.

18. A system for translating pulsating electrical signals including two space discharge devices each comprising an anode and a cathode element mounted in an envelope containing an ionizable atmosphere, means for applying constant electrical potentials to said anodes with respect to a common circuit connection to said cathodes, a control element disposed between the cathode and anode of each device, means for alternately raising and lowering the voltage drop between the cathode and the control element of each device, said last means comprising transformer means connected to the signal source, and including a plurality of secondary windings, one of each last-mentioned windings being individual to each respective control element, means for connecting electrically opposite ends of said secondary windings to said control elements, means for connecting the other ends of the said secondary windings to the common return circuit of said control elements, so that when a signal of one electrical polarity is received the control elements will be electrically oppositely charged, and a signal translating device having two operating windings connected respectively in the anode circuit of said devices.

GEORGE S. SCHABERLE.